United States Patent [19]

Rother

[11] 3,943,217

[45] Mar. 9, 1976

[54] PROCESS FOR MANUFACTURING BODIES OF VARIOUS SHAPES FROM INORGANIC POWDERS

[76] Inventor: Franz Rother, Hardtstrasse 1, 8560 Lauf, Germany

[22] Filed: July 25, 1973

[21] Appl. No.: 382,552

Related U.S. Application Data

[63] Continuation-in-part of Ser. No. 152,371, June 11, 1971, abandoned.

[30] Foreign Application Priority Data

June 11, 1970 Germany............................ 2028747

[52] U.S. Cl. ................................... 264/61; 264/63
[51] Int. Cl.² ........................................... C04B 35/00
[58] Field of Search ............. 264/109, 111, 117, 63, 264/61

[56] References Cited
UNITED STATES PATENTS

| 2,579,886 | 12/1951 | Vettel | 264/117 |
| 2,806,509 | 9/1957 | Bozzacco et al. | 264/109 |
| 3,166,615 | 1/1965 | Farrell | 264/111 |
| 3,423,496 | 1/1969 | Olstowski | 264/109 |
| 3,487,137 | 12/1969 | Kopel | 264/111 |
| 3,539,672 | 11/1970 | Valyi | 264/111 |
| 3,620,709 | 11/1971 | Petkovsek et al. | 264/117 |

*Primary Examiner*—Robert F. White
*Assistant Examiner*—Gene Auville
*Attorney, Agent, or Firm*—Ostrolenk, Faber, Gerb & Soffen

[57] ABSTRACT

Electrical insulator bodies of various shapes are manufactured from inorganic powders and binders by a novel process comprising the steps of (1) maintaining in an agitated state the inorganic powders having a size between about 0.040 mm. and 1 mm., (2) spraying onto said agitated powders up to 10 per cent by weight of a binder consisting essentially of a homogenous fluid mixture of an epoxy resin and hardener, (3) molding the resulting mixture, and (4) hardening the molded mixture at a temperature not exceeding 160° C., thereby producing a compact ceramic insulator material.

9 Claims, No Drawings

PROCESS FOR MANUFACTURING BODIES OF VARIOUS SHAPES FROM INORGANIC POWDERS

This is a continuation-in-part of Ser. No. 152,371, filed June 11, 1971 now abandoned.

The subject of the present invention is a process for manufacturing rigid bodies, e.g., electrical insulators, of various shapes from inorganic powders. Conventionally, a prepared mass is sintered by firing in a kiln forming what are called ceramics. The sintered product, i.e., the ceramic, brings out the best advantages of the physical and chemical properties of the raw materials used, for example, electric insulating properties, resistance to temperature fluctuation and to weathering, and in certain cases, special dielectric or magnetic properties (for example, in the case of titanates and ferrites). However, sintering to form a ceramic body has certain disadvantages. In particular, the manufacturing process involving sintering at elevated temperatures, is costly and time consuming. A further disadvantage is that the dimensions of the final product often vary considerably due to shrinkage during the sintering.

Many attempts have therefore been made to form such bodies of the desired shapes from inorganic powders without sintering. The inorganic powders were mixed with organic binders, the resulting mass being heated, if necessary, to comparatively moderate temperatures. The object is to make products which show the necessary physical and chemical properties, even though their properties may fall short, by a considerable amount, when compared to those of the corresponding sintered ceramics.

As a practical example of products made without sintering, by known methods, there by be mentioned the magnetic cores made from ferrite powders and binders as described in the German patent specification No. 756,383 on page 2, lines 103 et seq. These cores are used for the purpose of producing magnetic effects in high frequency electric fields.

A further proposal, according to the German patent specification (Auslegeschrift) No. 1,192,090, is to use a corresponding process for manufacturing bodies of various shapes for use as electric insulators. This proposal has, however, not been applied in practice.

Both processes mentioned above are suitable only for manufacturing bodies of comparatively simple shape, such as solid or hollow cylinders or rings for ferrite cores or the like. These processes are not suitable for manufacturing bodies of complex shape, such as are required for use as electric insulators.

The process according to the invention is a novel method for manufacturing bodies of various shapes from inorganic powders without sintering, the products not being limited to bodies of simple shape. The process according to the invention also has further advantages which will be described below.

The process according to the invention makes it possible, using simple and economical methods, to manufacture bodies containing 90% or more by weight of inorganic powders. Only very small quantities of organic binders are used and the products can be bodies of complex shape. A decisive production stage consists in that the inorganic components used as raw materials are placed in a tumbling barrel, or mixing drum, and sprayed, in the tumbling barrel, with a homogenous fluid mixture containing a synthetic resin and a hardener. The product is a material which can be molded in a press, without previously waiting for preliminary physical or chemical processes to take place, whereupon immediately after the pressing the resulting bodies of various shapes are hardened at a maximum temperature of 160° C.

The inorganic raw materials are preferably of such a kind that they already have a crystalline structure, either because that is how they occur in nature or due to a previous ceramic or other treatment. As examples of materials of this kind there may be mentioned calcite (calcspar), magnesite, synthetic ferrites, zirconium sand, titanates and titanium dioxide, if necessary prepared in special ways. Further, mineral silicates or silicate ceramic biproducts can be used. Additionally, if desired, graphite, retort coke or the like, can be employed.

It has been found that the strength and hardness of the product made by the process according to the invention depends on the grain size and grain distribution of the initial inorganic material and in any additives which may be used. Each particular mixture of inorganic raw materials requires its own particular range of grain sizes to give the best results, the optimal grain size range, to give the strongest final product, depending on the nature of the binder.

The strength and hardness of the product can be improved by adding to the comparatively coarse inorganic material, which has a grain size range between 0.1 mm and 1 mm, a quantity of very fine material made by size reducing the same initial inorganic substance followed by screening to give grain sizes of not less than 75 microns (about 200 mesh—U.S. standard sieve series) or 63 microns (about 230 mesh) or 40 microns (about 400 mesh). Up to 60% of the very fine powder may be added. However, it is possible to achieve acceptable products when all of the inorganic material is in the form of a fine powder, i.e., with a grain size not less than 40 microns.

A still further improvement in the quality of the product can be obtained by adding to the initial inorganic raw material, or to the resin binder, small quantities of a substance suitable for filling the pores, or which is capable of forming a lattice. Suitable materials are substances of colloidal or near-colloidal particle size, for example, silica, colloidal grahite or the like, or $SiO_2$, $TiO_2$ or $Al_2O_3$, preferably derived from the vapor phase. Up to 5% by weight of the colloidal or near-colloidal substance can be used (compare Examples 1–11).

Furthermore, substances such as certain dolomitic soapstones, which contain large fractions of microcrystalline products from the grinding, can be used. Up to 13.25% by weight based on the weight of all powders employed of a substance of this kind can be added to the initial raw material.

The addition of additives of this kind increases the ability of the mixture to trickle and to flow sufficiently to allow the products to be made by extrusion, which can be done under vacuum to remove air from the mixture. The addition of small quantities of the highly dispersed substances mentioned above improves the notch impact strength of the final product.

As the binder, epoxy resins with an appropriate hardener such as an amine or acid anhydride have been found suitable. For example, Araldite epoxy resins such as Araldite 6005, a liquid bisphenol A epoxy resin having a Gardner color at 20° C. of 4, an epoxy equivalent of 190 and a Gardner-Holt viscosity at 25° C. of 8000, can be used.

The resin binder used is preferably a colorless resin, allowing clean colors to be obtained by adding coloring substances. There can, if desired, be added to the mixture in the mixer, non-fading organic or inorganic dyes in concentrations up to 0.5%. This results in a product which is homogeneously colored, allowing products to be made which conform to a color code and there is no necessity to apply an external glaze.

The mass which is to be molded or extruded is prepared as follows. Into a mixture, there are charged the mineral components together with, if desired, additives in the form of colloids and dyes. The charge is mixed in moisture free conditions. The mixer can be of the heatable kind. Simultaneously, in a separate vessel, the resin binder is heated until liquid, whereupon the hardener is added. After mixing the resin thoroughly with the hardener, the resulting homogenous mixture of resin and hardener is sprayed in a liquid state onto the grain particles in the mixing drum, which is in operation continuously during the spraying. Mixing is continued unitl the material has cooled, wheeupon the cooled granular mass is removed from the drum ready for molding. This granular mass has good trickling or flow properties, and can be further processed as soon as it has been removed from the drum. The product can be molded by the molding and extrusion methods customary in ceramic technology. The good flow properties of the material, and its excellent molding granulate properties make it suitable for molding in automatic presses, preferably under a high pressing pressure.

An alternative method for molding the prepared ganular material, is to mount on the nozzle of an extrusion press, or other suitable pressing device, a metal mold of the injection molding type, equipped with venting channels. The prepared granular mass is injected cold into the mold and takes the desired shape quite easily, due to its good ability to slide in the mold. It is not necessary to allow the material to remain in the mold for a dwell period, as has hitherto been necessary in the molding of similar granular compositions.

The prepared masses, ready for molding, and the molded products themselves can be improved in various ways, by methods which will now be described.

In the first place, there can be added to the raw mixture in the mixing drum, or to the fluid resin-hardener mixture, small quantities of a suitable substance capable of removing or binding water. This gives the molded product an extemely low water absorption. A suitable substance for this purpose is, for example, silicon dioxide with extremely high surface area which is produced by evaporation of silicon compounds.

A further improvement in the new masses described above can be obtained by adding to the prepared molding granulate, either in the mixing drum or in a separate vessel, a small quantity of a hydrophobic silicic acid with extremely high surface area which is produced by evaporation of silicon compounds. The mass is treated in such a way that the grains become entirely coated with a very thin layer of the hydrophobic substance. This considerably improves the flow properties of the molding granulate. This method has a new and surprising effect on the shaping of the granular masses of the invention.

As already mentioned, the masses extracted from the mixing drum can be molded immediately. They need not be kept in storage. On the other hand, if the masses have been kept in storage for one reason or another, the stored mass can easily be regenerated by the treatment described above using a hydrophobic silicic acid or the like, the result being the immediate production of a regenerated molding granulate of the highest quality.

After the molding, the molded bodies are hardened, either in a warm cupboard or by conveying continuously through a warm oven, at temperatures not exceeding 160°C. At these low temperatures, any organic dyes which may have been added retain their full cover intensity.

The low hardening temperatures have the further advantage that it becomes possible to imbed in the molded products metal parts, armatures, solid semiconductors, magnetic bodies of all kinds, parts made of carbon or graphite, electric conductors and the like during the molding operation.

The process according to the invention is therefore suitable for making parts of composite construction. The properties of the bodies made according to the invention are determined almost exclusively by the properties of the inorganic initial raw materials, because they contain these materials in very high proportions. It is therefore possible, by choosing suitable inorganic raw materials, to produce products which have high dielectric constants, or particular ohmic resistances or special magnetic properties.

The bodies made by the process according to the invention have a very wide field of application, for example, as electric insulators, as parts of switches, magnetic and dielectric parts, potentiometer rings, and parts for heat conduction and heat insulation.

The technical advance provided by the process according to the invention and by the resulting products is considerable. The process according to the invention eliminates a number of manufacturing stages, compared to the customary ceramic method of manufacture. Production costs are therefore very low, particularly due to the very low hardening temperature of 160° C., compared with the temperatures of the order of 1200° C. used in ceramic technology. Further savings in production costs are obtained by imbedding metal or other parts during the molding operation. The products are accurate in their dimensions, within narrow tolerances, due to the fact that there is practically no shrinkage during the hardening. This allows complex and thin walled products to be made without distortion, as occurs by the ceramic method. There is therefore very little rejection of products, and this again contributes to lowering production costs.

The costs of the raw materials are low since these materials are mainly inexpensive inorganic substances. The process according to the invention can be applied, if desired, using manufacturing methods known in ceramic technology, with a high rate of production.

A further reason why costs are low is because the additives are required only in low concentrations. In particular, the coloring material and the hydrophobic Aerosils are required only in concentrations below 0.5%.

The products made by the process according to the invention have mechanical and electrical properties which approach quite closely to those of a porcelain of the type KER 111 according to DIN 40 685.

Several examples of mass compositions will now be indicated with the percentages being by weight. It should be observed that in all the examples the powdered minerals, ferrites or titanates, are screened before use to remove the very fine material. This is the reason, together with the special spraying process mentioned above, why the concentration of resin with hardener can be kept very low.

EXAMPLE 1

The following components were mixed together as described above:

| | | |
|---|---|---|
| calcite (calc-spar) | (0.1 to 1 mm grain size) | 45 % |
| calcite | (screened 200 mesh) | 45 % |
| epoxy resin | (Araldite 6005) | 7.4 % |
| hardener | | 2.6 % |
| | | 100.0% |

The mixture was placed in a mold and hardened immediately at elevated temperature. The molded products showed the following properties (compare DIN 40 685):

| | |
|---|---|
| Bending strength | 400 kp/cm² |
| Notch impact strength | 1.7 kp cm/cm² |
| Tracking resistance | Ka 3 c |
| Surface resistance | $10^{13} - 10^{14}$ ohm |
| Volume resistance | $\sim 10^{13} - 10^{14}$ ohm cm |
| Density | 2.0 kg/dm³ |
| Resistance to temperature fluctuation | up to 200° C. |

EXAMPLE 2

4500 g. of calcite having a grain size between 0.1 and 0.8 mm. was intimately mixed for 0.5 hour with 4500 g. of calcite having a grain size of about 40 μm in a Simplex mixer made by the firm of Werner and Pfleiderer. This load was previously warmed to 100° C. to remove moisture, although a heatable mixing drum could have been used to remove moisture during the mixing stage. At the same time, 740 g. of an epoxy resin (Araldite 6005) was melted at 135° C. in a container coupled to the mixer. 260 g. of powdered hardener (CIBA's HT 976) was added to the liquid resin and when this resin-hardener mix became completely liquid at 135° C., it was thoroughly and homogeneously mixed with a stirrer. During this mixing, 30 g. of a red non-fading dye (Helioechtrot BB) was added. The resulting homogenous dyed resin-hardener mix was then sprayed into the mixing drum by means of a compressed air stream. Running of the drum was continued for 0.5 hour to achieve thorough mixing, and after the first 15 minutes of mixing, 30 g. of hydrophobic silica acid from the vapor phase (Aerosil R 972) was added.

When the mixing was finished, the resultant mass was run off from the mixing drum and could be worked at once, i.e., pressed or drawn to form shaped bodies. Pressing was carried out at a pressure of 1000 kg/cm². The pressed shaped bodies were then hardened in a drying oven at a temperature of 160° C., and to be more accurate, were heated slowly for 4–8 hours (according to size) at 110° C. and then for 6–8 hours (according to size) at 160° C.

The hardened molded products show the same strength and resistance values as in Example 1.

EXAMPLE 3

There were mixed together:

| | | |
|---|---|---|
| calcite | (0.1 – 1 mm grain size) | 40 % |
| calcite | (screened 200 mesh) | 40 % |
| finely ground talc or soapstone | | 10 % |
| epoxy resin | (Araldite 6005) | 7.4 % |
| hardener | | 2.6 % |
| | | 100.0 % |

To which was added:

| | |
|---|---|
| silicic acid from the vapor phase | 0.3 % |

The molded and hardened product had the following properties (compare DIN 40 685):

| | |
|---|---|
| bending strength | 395 kp/cm² |
| notch impact strength | 1.9 kp cm/cm² |
| tracking resistance | Ka 3 c |
| surface resistance | $10^{13}$ ohm |
| volume resistance | $\sim 10^{13}$ ohm.cm |
| density | 2.0 kg/dm³ |
| resistance to temperature fluctuation | up to 200° C. |

EXAMPLE 4

There were mixed together:

| | | |
|---|---|---|
| calcite | (0.1 – 0.9 mm grain size) | 40 % |
| calcite | (screened 200 mesh) | 40 % |
| dolomitic soapstone | (400 mesh, alkali free) | 10 % |
| epoxy resin | (Araldite 6005) | 7.4 % |
| hardener | | 2.6 % |
| | | 100.0 % |

To which was added:

| | |
|---|---|
| highly dispersed silicic acid | 0.4 % |

EXAMPLE 5

There were mixed together:

| | | |
|---|---|---|
| calcite | (0.1 – 1 mm grain size) | 30 % |
| calcite | (screened 200 mesh) | 60 % |
| epoxy resin | (Araldite 6005) | 7.4 % |
| hardener | | 2.6 % |
| | | 100.0 % | to which was added:

| | |
|---|---|
| silicic acid from the vapor phase | 0.6 % |

EXAMPLE 6

There were mixed together:

| | | |
|---|---|---|
| calcite | (0.1 – 0.9 mm grain size) | 30 % |
| calcite | (screened 200 mesh) | 50 % |
| dolomitic soapstone | (400 mesh) | 13.25 % |
| epoxy resin | (Araldite 6005) | 5.0 % |
| hardener | | 1.75 % |
| | | 100.00 % |

To which were added:

| | |
|---|---|
| aluminum oxide from the vapor phase | 0.5 % |
| highly dispersed silicic acid | 0.5 % |

EXAMPLE 7

There were mixed together:

| | | |
|---|---|---|
| calcite | (0.1 – 1 mm grain size) | 30 % |
| calcite | (screened 200 mesh) | 60 % |
| epoxy resin | (Araldite 6005) | 7.4 % |
| hardener | | 2.6 % |
| | | 100.0 % |

To which were added:

| | |
|---|---|
| colloidal graphite | 3.0 % |
| silicic acid from the vapor phase | 0.5 % |

EXAMPLE 8

There were mixed together:

| | | |
|---|---|---|
| ferrite | (0.1 – 1 mm grain size) | 30 % |
| ferrite | (screened 230 mesh) | 60 % |
| epoxy resin | (Araldite 6005) | 7.4 % |
| hardener | | 2.6 % |
| | | 100.0 % |

To which were added:

| | |
|---|---|
| colloidal graphite | 0.5 % |
| silicic acid from the vapor phase | 0.7 % |

EXAMPLE 9

There were mixed together:

| | | |
|---|---|---|
| titanate | (screened 200 mesh) | 60 % |
| titanate | (screened 230 mesh) | 30 % |
| epoxy resin | (Araldite 6005) | 7.4 % |
| hardener | | 2.6 % |
| | | 100.0 % |

To which was added:

| | |
|---|---|
| titanium dioxide from the vapor phase | 0.5 % |

EXAMPLE 10

There were mixed together:

| | | |
|---|---|---|
| ferrite | (0.1 – 0.2 mm grain size) | 45 % |
| ferrite | (screened 200 mesh) | 45 % |
| epoxy resin | (Araldite 6005) | 7.4 % |
| hardener | | 2.6 % |
| | | 100.0 % |

To which was added:

| | |
|---|---|
| carbonyl iron | 1.0 % |

EXAMPLE 11

There were mixed together:

| | | |
|---|---|---|
| retort coke | (0.1 – 1 mm grain size) | 45 % |
| retort coke | (screened 200 mesh) | 45 % |
| epoxy resin | (Araldite 6005) | 7.4 % |
| hardener | | 2.6 % |
| | | 100.0 % |

To which were added:

| | |
|---|---|
| colloidal graphite | 1.0 % |
| silicic acid from the vapor phase | 0.3 % |

Each of the composite mixtures of Examples 3–11 were molded as in Example 2 and hardened at a temperature below 160° C.

The compositions indicated above are examples according to the invention. The combinations of the various substances can, of course, be modified appropriately to suit the particular application for which the product is intended. In particular, smaller grain sizes can be used, if desired, for dielectric and for magnetic molded products.

I claim:

1. A process for manufacturing electrical insulator bodies of various shapes from at least 90% crystalline inorganic mineral powders and binders which comprises the following steps:
   1. maintaining in an agitated state the inorganic powders having a size between 0.040 mm and 1.0 mm;
   2. spraying onto said agitated powders at elevated temperature sufficient to liquefy the binder, up to 10 percent by weight of total mixture of a binder consisting essentially of a homogenous fluid mixture of an epoxy resin and hardener so as to form a granular mass;
   3. molding the resulting mixture; and
   4. Hardening the molded mixture at a temperature not exceeding 160° C., thereby producing a compact dense, nonporous ceramic insulator material.

2. Process according to claim 1 wherein the inorganic powder is mineral calcite.

3. Process according to claim 1 wherein there is added to the inorganic powder or to the binder a colloidal or near-colloidal substance in a concentration up to 5% by weight.

4. Process according to claim 1 wherein a part of the inorganic powder is chosen between 0.1 and 1.0 mm particles size, and the remaining part is sieved to eliminate particles having a size less than 40 microns and having a size more than about 1 mm.

5. Process according to claim 1 wherein metal parts, electric conductors or other solid bodies are inserted into the mixture before molding and hardening.

6. Process according to claim 1 wherein up to 5 percent by weight of highly dispersed silica, colloidal graphite, $TiO_2$ or $Al_2O_3$, derived from the vapor phase or having colloidal or near-colloidal particle size, is added to the mixture.

7. Process according to claim 1 wherein the inorganic powder contains up to 13.25% by weight of the mixture, of dolomitic soapstone in powder form.

8. Process according to claim 1 wherein a nonfading dye in concentrations up to 0.5% is added to the mixture.

9. Process according to claim 1 wherein the mixture is molded in a metal mold equipped with venting means and mounted on the nozzle of an extrusion press through which the mass is forced in the cold state.

* * * * *